United States Patent
Bruce et al.

(10) Patent No.: US 10,077,133 B2
(45) Date of Patent: Sep. 18, 2018

(54) NESTABLE PALLETS AND METHODS FOR FORMING THE SAME

(71) Applicant: Buckhorn Inc., Milford, OH (US)

(72) Inventors: John Kevin Bruce, Burlington, KY (US); Paul J. Ficker, Cincinnati, OH (US)

(73) Assignee: BUCKHORN, INC., Milford, OH (US)

( * ) Notice: Subject to any disclaimer, the term of this patent is extended or adjusted under 35 U.S.C. 154(b) by 0 days.

(21) Appl. No.: 15/250,157

(22) Filed: Aug. 29, 2016

(65) Prior Publication Data

US 2017/0081075 A1    Mar. 23, 2017

Related U.S. Application Data

(60) Provisional application No. 62/221,953, filed on Sep. 22, 2015.

(51) Int. Cl.
 *B65D 19/00* (2006.01)
 *B65D 19/38* (2006.01)
 (Continued)

(52) U.S. Cl.
 CPC ............ *B65D 19/385* (2013.01); *B29C 43/00* (2013.01); *B29C 49/00* (2013.01); *B29C 65/02* (2013.01);
 (Continued)

(58) Field of Classification Search
 CPC ............... B65D 19/0071; B65D 19/38; B65D 19/0018; B65D 19/0028; B65D 2519/00034; B65D 2519/00069; B65D 2519/00104; B65D 2519/00273; B65D 2519/00293; B65D 2519/00323; B65D 2519/00373; B65D 2519/0094
 (Continued)

(56) References Cited

U.S. PATENT DOCUMENTS

| 3,717,922 A | * | 2/1973 | Witkowski | ......... | B65D 19/0028 |
| | | | | | 108/51.11 |
| 4,051,786 A | * | 10/1977 | Nordgren | ........... | B65D 19/0028 |
| | | | | | 108/56.3 |

(Continued)

FOREIGN PATENT DOCUMENTS

| CA | 2314606 | * | 6/1999 |
| WO | WO02057149 | * | 7/2002 |
| WO | WO2008054219 | * | 5/2008 |

*Primary Examiner* — Janet M Wilkens
(74) *Attorney, Agent, or Firm* — Benesch, Friedlander, Coplan & Aronoff LLP

(57) ABSTRACT

According to the embodiments described herein, a nestable pallet can include an upper deck and a lower deck. The upper deck can forms a product support region. The upper deck can include a plurality of foot members each formed as a cavity within the product support region of the upper deck. Each of the foot members can include a base portion offset downward from the from the product support region of the upper deck. The lower deck can be joined to the upper deck and can be disposed downwards from the upper deck. The lower deck can include a plurality of foot strengthening orifices. Each of the foot strengthening orifices can include a support rim. The foot members of the upper deck can be received by the foot strengthening orifices and constrained by the support rim.

19 Claims, 11 Drawing Sheets

(51) Int. Cl.
*B29C 69/00* (2006.01)
*B29C 65/02* (2006.01)
*B29C 65/00* (2006.01)
*B29C 43/00* (2006.01)
*B29C 49/00* (2006.01)
*B29K 101/12* (2006.01)
*B29L 31/00* (2006.01)

(52) U.S. Cl.
CPC .............. *B29C 66/43* (2013.01); *B29C 69/00* (2013.01); *B65D 19/004* (2013.01); *B29K 2101/12* (2013.01); *B29L 2031/7178* (2013.01); *B65D 2519/00034* (2013.01); *B65D 2519/00069* (2013.01); *B65D 2519/0094* (2013.01); *B65D 2519/00273* (2013.01); *B65D 2519/00288* (2013.01); *B65D 2519/00318* (2013.01); *B65D 2519/00338* (2013.01); *B65D 2519/00412* (2013.01); *B65D 2519/00562* (2013.01)

(58) Field of Classification Search
USPC ...... 108/56.1, 56.3, 901, 53.3, 57.25, 57.27, 108/57.31, 57.26
See application file for complete search history.

(56) References Cited

U.S. PATENT DOCUMENTS

| | | | | |
|---|---|---|---|---|
| 4,425,852 A | * | 1/1984 | Riviere | B65D 19/40 108/53.3 |
| 4,879,956 A | * | 11/1989 | Shuert | B65D 19/0018 108/52.1 |
| 5,996,508 A | * | 12/1999 | Constantino | B65D 19/0018 108/53.1 |
| 2003/0075081 A1 | * | 4/2003 | Apps | B65D 19/0012 108/56.3 |

* cited by examiner

NESTABLE PALLETS AND METHODS FOR FORMING THE SAME

CROSS-REFERENCE TO RELATED APPLICATIONS

This application claims priority from U.S. Provisional Patent Application No. 62/221,953, filed on Sep. 22, 2015, which is incorporated by reference herein in its entirety.

FIELD OF INVENTION

The present disclosure relates to nestable pallets and methods for forming the same. Specifically, the disclosure relates to nestable pallets formed from an upper deck and a lower deck and methods for forming the same.

BACKGROUND

Pallets can be utilized to assist with transporting and storing goods of various size, weight, and composition. The pallet can provide a substantially flat surface for holding goods and a structure for supporting the goods upon a surface. The structure can further provide an interface for handling by a transport device. Typical transport devices can include forklifts, pallet jacks, front loaders, or the like.

Pallets can be formed from plastic. Plastic pallets can be utilized for transporting materials in a biologically safe manner. Moreover, plastic pallets can be formed with multiple feet to facilitate loading upon a transport device from multiple directions. Generally, plastic pallets are relatively durable compared to material such as wood. However, the feet of plastic pallets can collapse from plastic creep, when utilized to store heavy loads for long periods. Additionally, repair of plastic pallets can be cost prohibitive or exceed the cost of a replacement pallet.

Accordingly, a need exists for alternative nestable pallets.

SUMMARY OF THE INVENTION

In one embodiment, a nestable pallet can include an upper deck and a lower deck. The upper deck can form a product support region. The upper deck can include a plurality of foot members each formed as a cavity within the product support region of the upper deck. Each of the foot members can include a base portion offset downward from the product support region of the upper deck. The lower deck can be joined to the upper deck and can be disposed downwards from the upper deck. The lower deck can include a plurality of foot strengthening orifices. Each of the foot strengthening orifices can include a support rim. The foot members of the upper deck can be received by the foot strengthening orifices and constrained by the support rim In another embodiment, a nestable pallet can include an upper deck and a lower deck. The upper deck can form a product support region that is demarcated by a first perimeter. The upper deck can include an outer rim that extends away from the first perimeter of the upper deck. The lower deck can be disposed downwards from the upper deck. The lower deck can include a joining platform that forms a second perimeter. The joining platform can be aligned with the outer rim of the upper deck at a joining angle φ. The joining angle φ can be acute.

In a further embodiment, a method for forming a nestable pallet can include molding an upper deck from a thermoplastic material. The upper deck can comprise a plurality of foot members each formed as a cavity within a product support region of the upper deck. A lower deck can be molded from the thermoplastic material. The lower deck can include a plurality of foot strengthening orifices. The upper deck and the lower deck can be heated to a joining temperature. The foot members of the upper deck can be inserted into the foot strengthening orifices of the lower deck. The foot members can be constrained by the foot strengthening orifices. The upper deck and the lower deck can be cooled from the joining temperature, while the upper deck and lower deck are in contact to form the nestable pallet.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The embodiments described herein generally relate to nestable pallets formed from an upper deck and a lower deck. The upper deck can comprise a plurality of foot members that are reinforced by the lower deck. Various embodiments of the nestable pallet and methods for forming the same are described in more detail herein.

Figure 1:
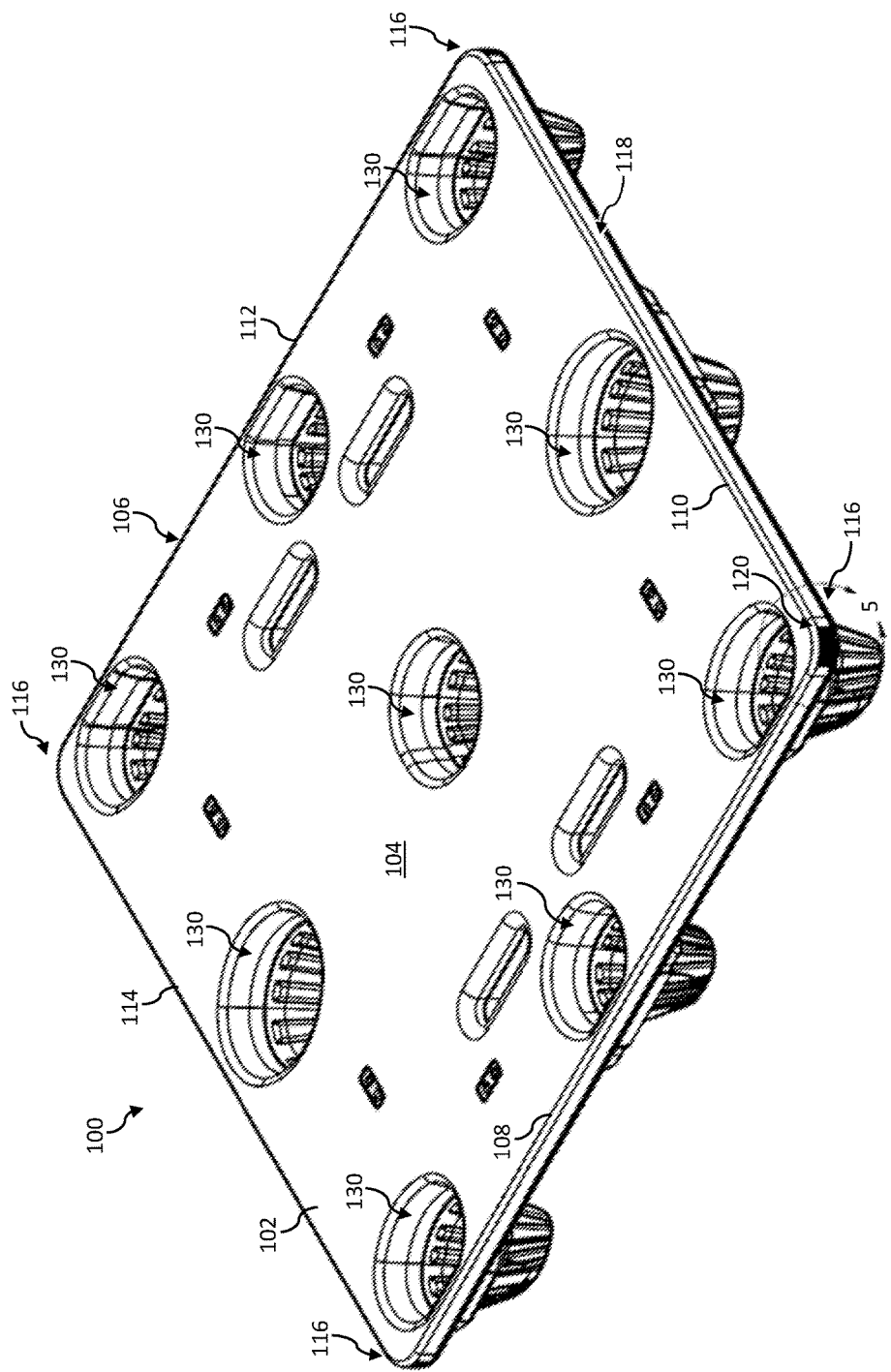
FIG. 1 schematically depicts a perspective view of a nestable pallet according to one or more embodiments shown and described herein.
Figure 2:
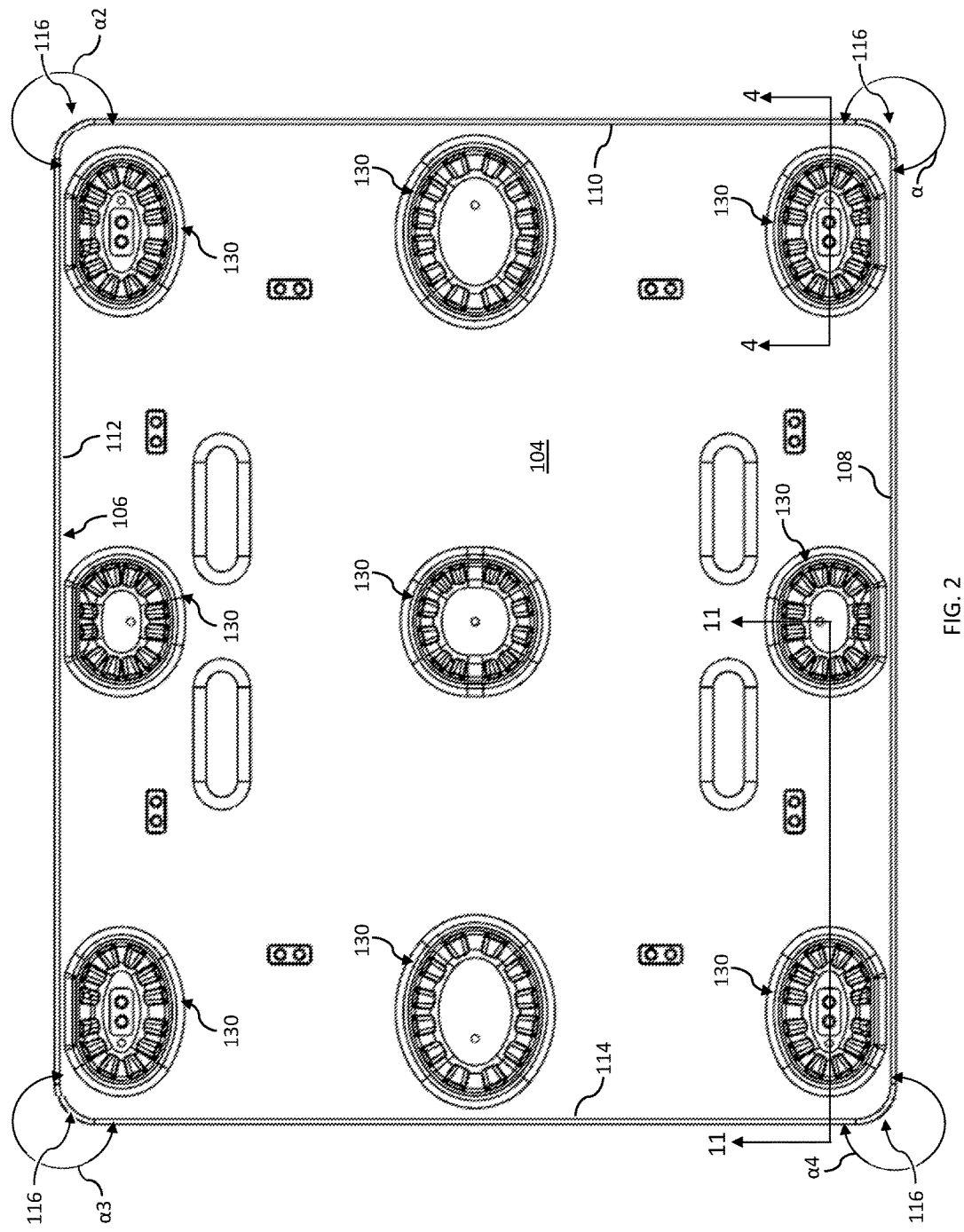
FIG. 2 schematically depicts a top plan view of the nestable pallet of FIG. 1 according to one or more embodiments shown and described herein.
Figure 3:
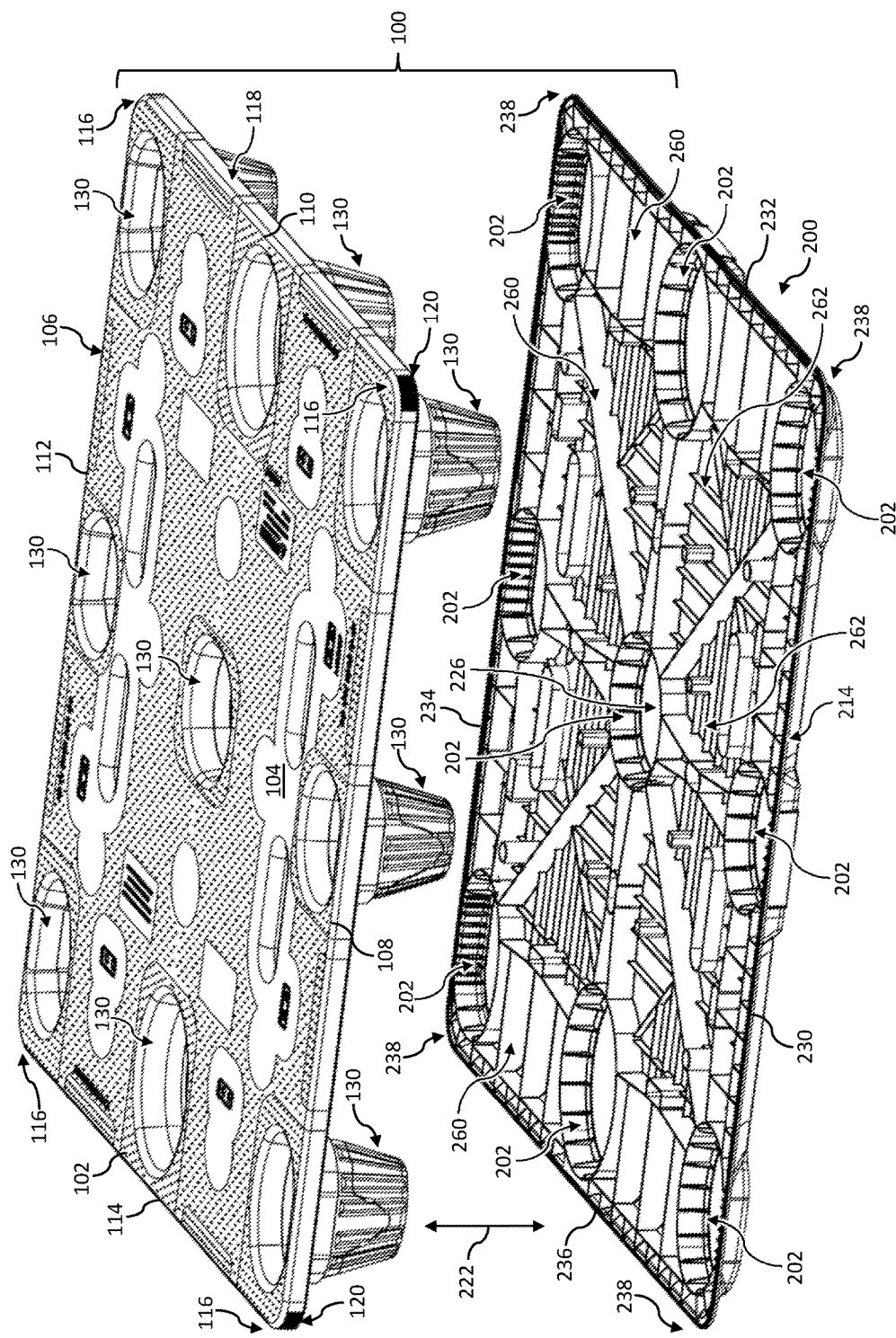
FIG. 3 schematically depicts an exploded view of the nestable pallet of FIG. 1 according to one or more embodiments shown and described herein.

Referring collectively to FIGS. 1, 2 and 3, an embodiment of a nestable pallet 100 is schematically depicted. In some embodiments, the nestable pallet 100 can be formed from thermoplastic material such as, for example, Acrylonitrile Butadiene Styrene (ABS), Polycarbonate, Polyethylene, Polypropylene, or any other heat moldable polymer. In some embodiments, the nestable pallet 100 can comprise an upper deck 102 and a lower deck 200 that each can be formed as separate components and joined together to form the nestable pallet 100. The upper deck 102 and the lower deck 200 can comprise a thermoplastic material that can be formed according to any type of plastic molding process such as, for example, injection molding, rotational molding, blow molding or the like. The upper deck 102 can be joined to the lower deck 200 utilizing a heat joining process such as, for example, fusion bonding, plastic welding, which can utilize external heating, internal heating, or the like.

The upper deck 102 of the nestable pallet 100 can be configured to support goods above a surface. In some embodiments, the upper deck 102 can form a product support region 104 that provides a substantially planar surface for holding goods. The product support region 104 of the upper deck 102 can be demarcated by a perimeter 106. In some embodiments, the perimeter 106 can be configured to define a shape for the product support region 104. For example, the perimeter 106 can define a product support region 104 having a substantially rectangular shape. It is noted that the term "nestable," as used herein, can mean configured for stacking in an interlocking fashion.

Accordingly, the perimeter 106 can comprise a plurality of substantially linear edges. Specifically, the perimeter 106 can comprise a first edge 108, a second edge 110, a third edge 112, and a fourth edge 114. In some embodiments, the first edge 108 can be substantially parallel to the third edge 112. Likewise, the second edge 110 can be substantially parallel to the fourth edge 114. Each of the first edge 108, the second edge 110, the third edge 112, and the fourth edge 114 can intersect with another edge to form an intersection region 116. Each intersection region 116 can be characterized by an intersection angle α.

Specifically, and referring to FIG. 2, the first edge 108 can be aligned with the second edge 110 at an intersection angle α. The second edge 110 can be aligned with the third edge 112 at an intersection angle α2. The third edge 112 can be aligned with the fourth edge 114 at an intersection angle α3. The fourth edge 114 can be aligned with the first edge 108 at an intersection angle α4. In some embodiments, the intersection angle α can be substantially obtuse such as, for example, greater than about 200° in one embodiment, between about 300° and about 240° in another embodiment, or about 270° in a further embodiment. Each of the intersection angle α, the intersection angle α2, the intersection angle α3 and the intersection angle α4 can be substantially the same. Alternatively, one or more of the intersection angle α2, the intersection angle α3 and the intersection angle α4 can differ from the intersection angle α. Thus, it is noted that, while the product support region 104 is depicted in FIG. 2 as having a substantially rectangular shape, the product support region 104 can be provided in any desired shape.

Figure 4:
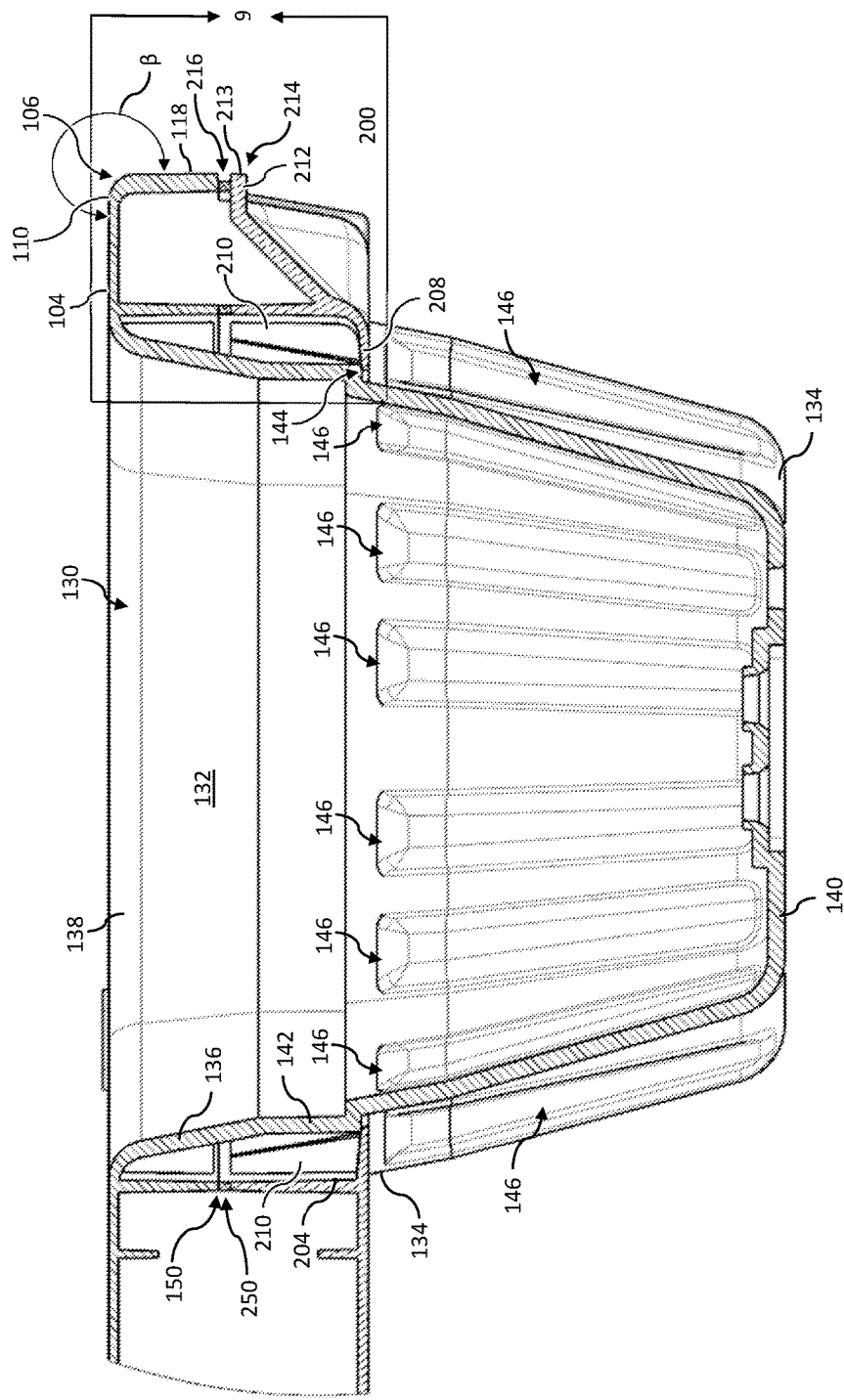
FIG. 4 schematically depicts a cross-sectional view taken along line 4-4 of the nestable pallet of FIG. 2 according to one or more embodiments shown and described herein.

Referring collectively to FIGS. 1, 3 and 4, the upper deck 102 can comprise an outer rim 118 configured to join with a lower deck 200 to form the nestable pallet 100. In some embodiments, the outer rim 118 can extend away from the perimeter 106 of the product support region 104. For example, the outer rim 118 may be aligned with the product support region 104 at a downward angle β, as shown in FIG. 4. In some embodiments, the intersection angle β can be substantially obtuse such as, for example, greater than about 200° in one embodiment, between about 300° and about 240° in another embodiment, or about 270° in a further embodiment. Accordingly, the outer rim 118 can span from the product support region 104 to the lower deck 200. It is noted that, while the outer rim 118 is depicted as being substantially linear, the outer rim 118 can be substantially arcuate.

Figure 5:
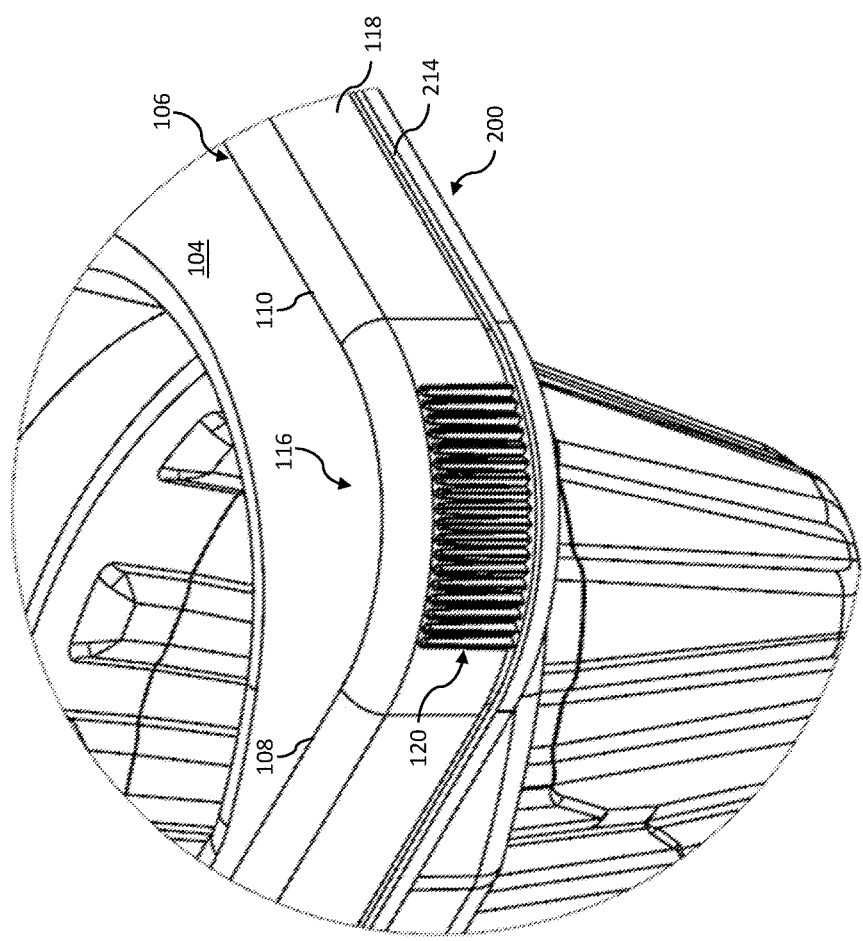
FIG. 5 schematically depicts enlarged view 5 of the nestable pallet of FIG. 1 according to one or more embodiments shown and described herein.

Referring now to FIG. 5, the outer rim 118 can be rounded at each intersection region 116. Accordingly, the outer rim 118 can form a radius as the outer rim 118 travels along the perimeter 106 at each intersection region 116. In some embodiments, the outer rim 118 at one or more of the intersection regions 116 can comprise a friction member 120 that provides a region of relatively high friction compared to the outer rim 118. In some embodiments, the friction member 120 can comprise a plurality of serrations that project away from the outer rim 118. Alternatively or additionally, each serration can be spaced apart from one another such that each serration forms a crest-like object and the outer rim 118 forms trough-like object. Since the outer rim 118 can be rounded or relatively smooth, it can be difficult to utilize shrink wrap to protect goods loaded upon the product support region 104. Accordingly, the friction member 120 can provide a feature for contacting and retaining shrink wrap to facilitate shrink wrapping.

Referring collectively to FIGS. 1, 2 and 3, the upper deck 102 can comprise a plurality of foot members 130 that are configured to contact a surface beneath the nestable pallet 100 and separate the product support region 104 from the surface. For example, during normal operation, the foot members 130 can be placed in contact with a surface beneath the nestable pallet 100 such that the product support region 104 forms an elevated platform above the surface. In some embodiments, each of the foot members 130 can be formed as a cavity in the product support region 104 of the upper deck 102.

Figure 6:
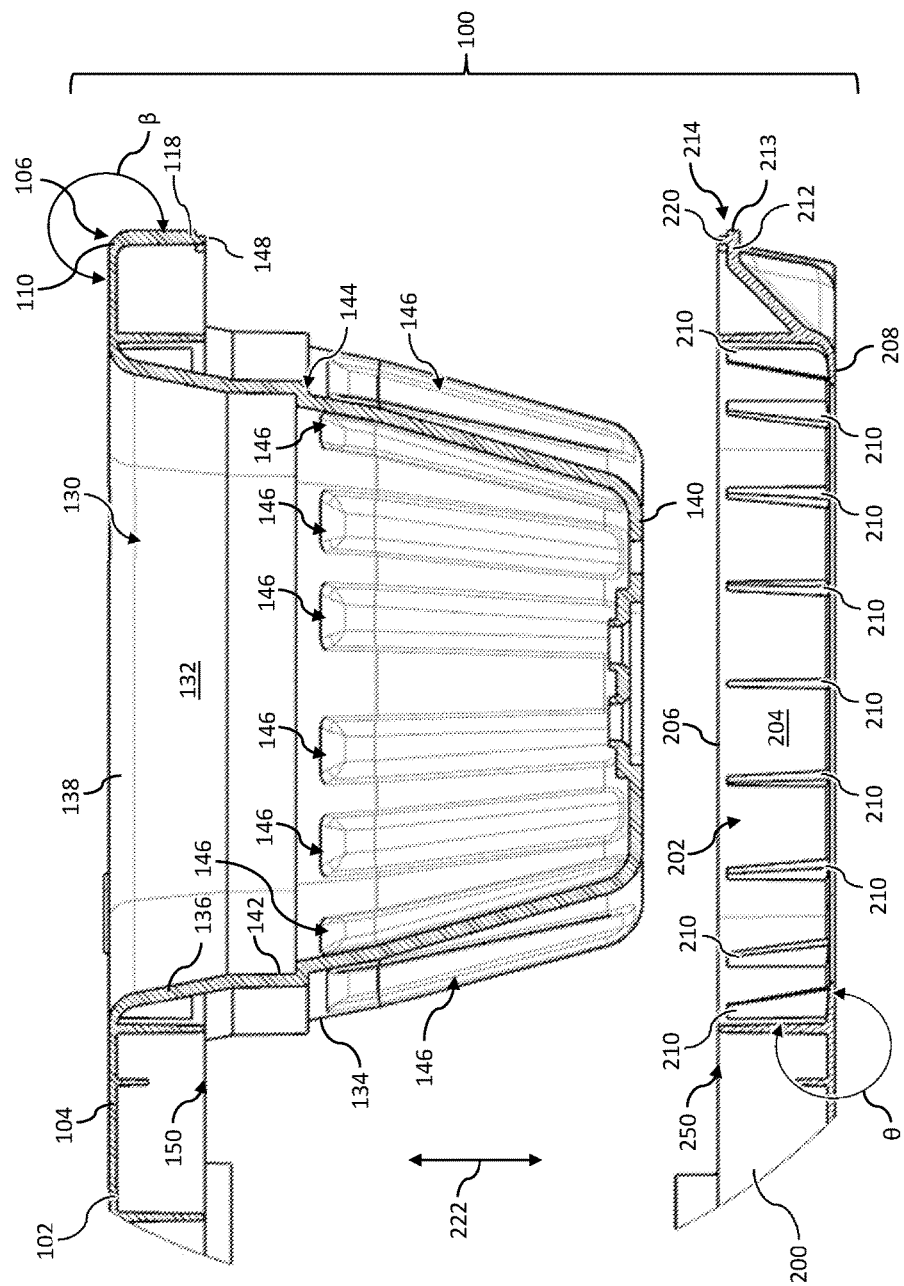
FIG. 6 schematically depicts an exploded view of the nestable pallet of FIG. 4 according to one or more embodiments shown and described herein.

Referring collectively to FIGS. 4 and 6, each foot member 130 can comprise a nesting surface 132 disposed within the cavity and an outer surface 134. In some embodiments, each foot member 130 can be formed as a substantially solid body 136 bounded by the nesting surface 132 and the outer surface 134. Accordingly, a thickness of the body 136 can be defined between by the nesting surface 132 and an outer surface 134. The nesting surface 132 can be configured to receive a foot member 130 such as, for example, from another pallet. Accordingly, as is explained in greater detail herein, the nesting surface 132 can comprise a flared mouth 138 that forms a relatively large opening compared to the outer surface 134 of the foot member 130. In some embodiments, the flared mouth 138 of the nesting surface 132 of the foot member 130 can form a radius that smoothly transitions the nesting surface 132 of the foot member 130 to the product support region 104. Thus, the body 136 of the foot member 130 can form a radius adjacent to the product support region 104.

Each foot member 130 can comprise a base portion 140 for supporting the foot member 130 upon a surface. The base portion 140 of the foot member 130 can be offset downwardly from the product support region 104. Alternatively or additionally, the base portion 140 can be offset downwardly from the flared mouth 138 of the foot member 130. In some embodiments, the outer surface 134 of the foot member 130 can form a substantially planar surface at the base portion 140. Accordingly, the base portion 140 can be substantially parallel with the product support region 104. In some embodiments, the base portion 140 of the foot member 130 can be smaller than the flared mouth 138 of the foot member 130. For example, the body 136 of the foot member 130 can be tapered inward as the body 136 spans from the product support region 104 to the base portion 140 of the foot member 130. Accordingly, a substantially identically shaped foot member can be received by and nested within each foot member 130.

In some embodiments, the body 136 of the foot member 130 can comprise a shank portion 142 for aiding in assembly of the nestable pallet 100. The shank portion 142 can be offset downwardly from the product support region 104. Additionally, the shank portion 142 can be offset upwardly from the base portion 140. In some embodiments, the foot member 130 can be substantially cylindrically shaped at the shank portion 142. Accordingly, the outer surface 134 of the foot member 130 can form a mounting feature 144 that projects outwardly, i.e., in a direction away from the nesting surface 132, at the shank portion 142.

Referring still to FIGS. 4 and 6, each foot member 130 can be fluted for additional rigidity. Specifically, the foot member 130 can be fluted such that the body 136 forms a plurality of strengthening furrows 146. Each of the strengthening furrows 136 can be formed as an indentation in the outer surface 134 and a protrusion of the nesting surface 132. Alternatively, each of the strengthening furrows 136 can be formed as an indentation in the nesting surface 132 and a protrusion of the outer surface 134. In some embodiments, the strengthening furrows 146 can be located downward from the shank portion 142 of the foot member 130. For example, each strengthening furrow 146 can extend along the foot member 130 between the shank portion 142 and the base portion of the foot member 130. In some embodiments, each strengthening furrow 146 can extend a majority of the span between the shank portion 142 and the base portion of the foot member 130.

Referring collectively to FIGS. 3, 4, 6, 7 and 8, the nestable pallet 100 can comprise a lower deck 200 configured to provide additional strength to the upper deck 102. Alternatively or additionally, the lower deck 200 can be configured to provide additional strength to the foot members 130. According to the embodiments described herein, the upper deck 102 and the lower deck 200 can be joined to form the nestable pallet 100.

Figure 8:
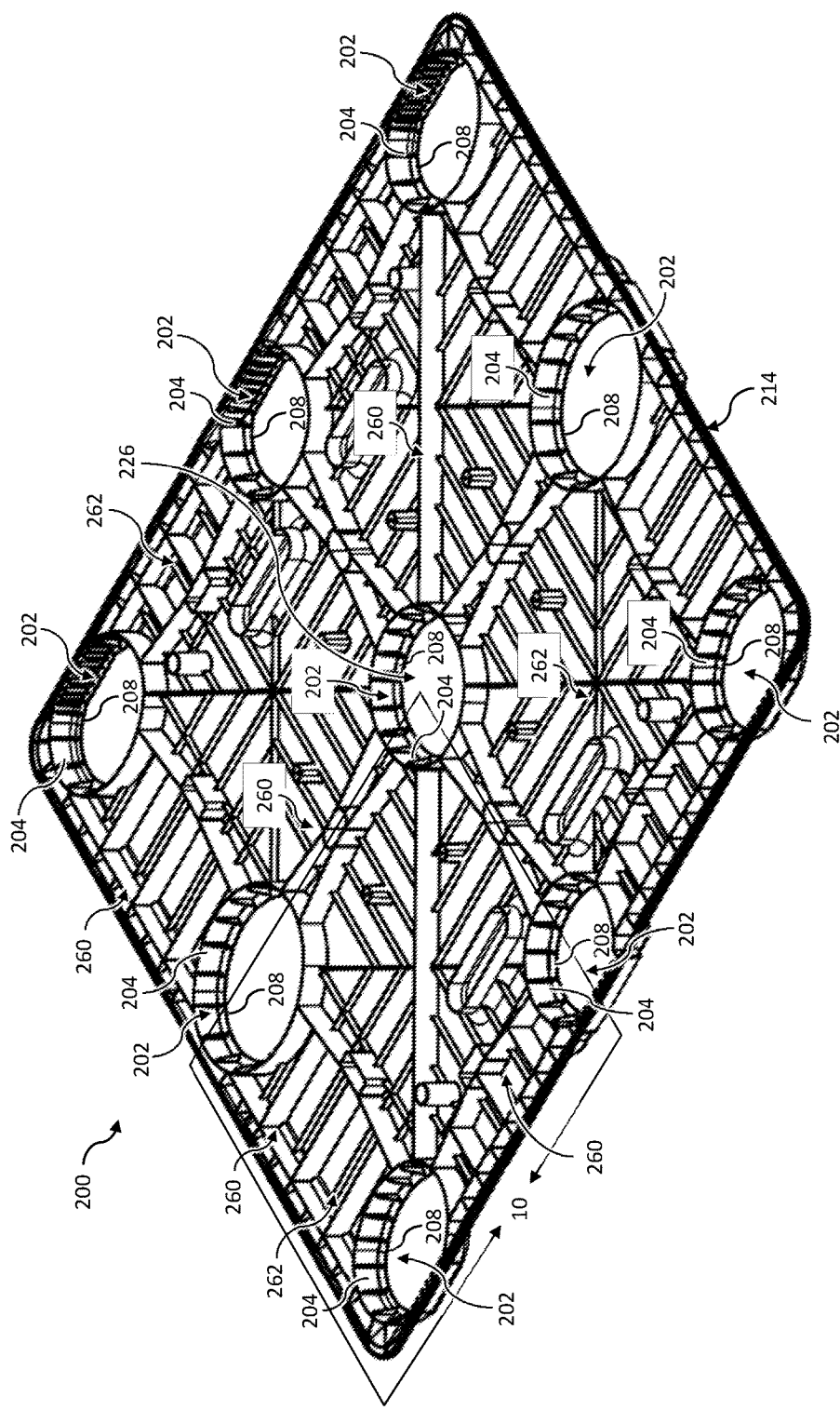
FIG. 8 schematically depicts a top perspective view of a lower deck of a nestable pallet according to one or more embodiments shown and described herein.

Referring collectively to FIGS. 3, 6 and 8, the lower deck 200 can comprise a plurality of foot strengthening orifices 202 each configured to receive and retain the foot member 130. In some embodiments, the foot strengthening orifice 202 can comprise an inner surface 204 that extends from a top edge 206 of the lower deck 200 to a support rim 208. When the foot member 130 is received by the foot strengthening orifice 202, the inner surface 204 of the foot strengthening orifice 202 can be concentric to the outer surface 134 of the shank 142 of the foot member 130. Additionally, the inner surface 204 of the foot strengthening orifice 202 can have a larger perimeter than the outer surface 134 of the shank 142 of the foot member 130.

The support rim 208 can be configured to provide reinforcement of the foot member 130. In some embodiments, the support rim 208 can project away from the inner surface 204 of the foot strengthening orifice 202 and towards the foot member 130. Alternatively or additionally, the support rim 208 can be concentric to the foot member 130. The support rim 208 can be aligned with the inner surface 204 at a support angle θ. In some embodiments, the support angle θ can be substantially obtuse such as, for example, greater than about 200° in one embodiment, between about 300° and about 240° in another embodiment, or about 270° in a further embodiment. In some embodiments, the support rim 208 can contact the mounting feature 144 of the foot member 130. Accordingly, the support rim 208 can constrain motion of the foot member 130 to provide downward support, concentric support, or both to mitigate bending moments in the foot member 130.

According to the embodiments described herein, the foot strengthening orifice 202 can comprise a plurality of stiffening members 210 each configured to strengthen the support rim 208. Each stiffening member 210 can be coupled to the inner surface 204 and the support rim 208. In some embodiments, the stiffening members 210 can extend along the inner surface 204 downwards to the support rim 208. Each stiffening member 210 can project away from the inner surface 204 to define a width of the stiffening member 210. The width of the stiffening member 210 proximate to the top edge 206 of the lower deck 200 can be relatively small compared to the width of the stiffening member 210 proximate to the support rim 208. For example, the width of the stiffening member 210 can increase as the stiffening member extends downwards to the support rim 208. In some embodiments, the stiffening member 210 can be shaped such that the width of the stiffening member 210 is largest at the support rim 208.

Figure 9:
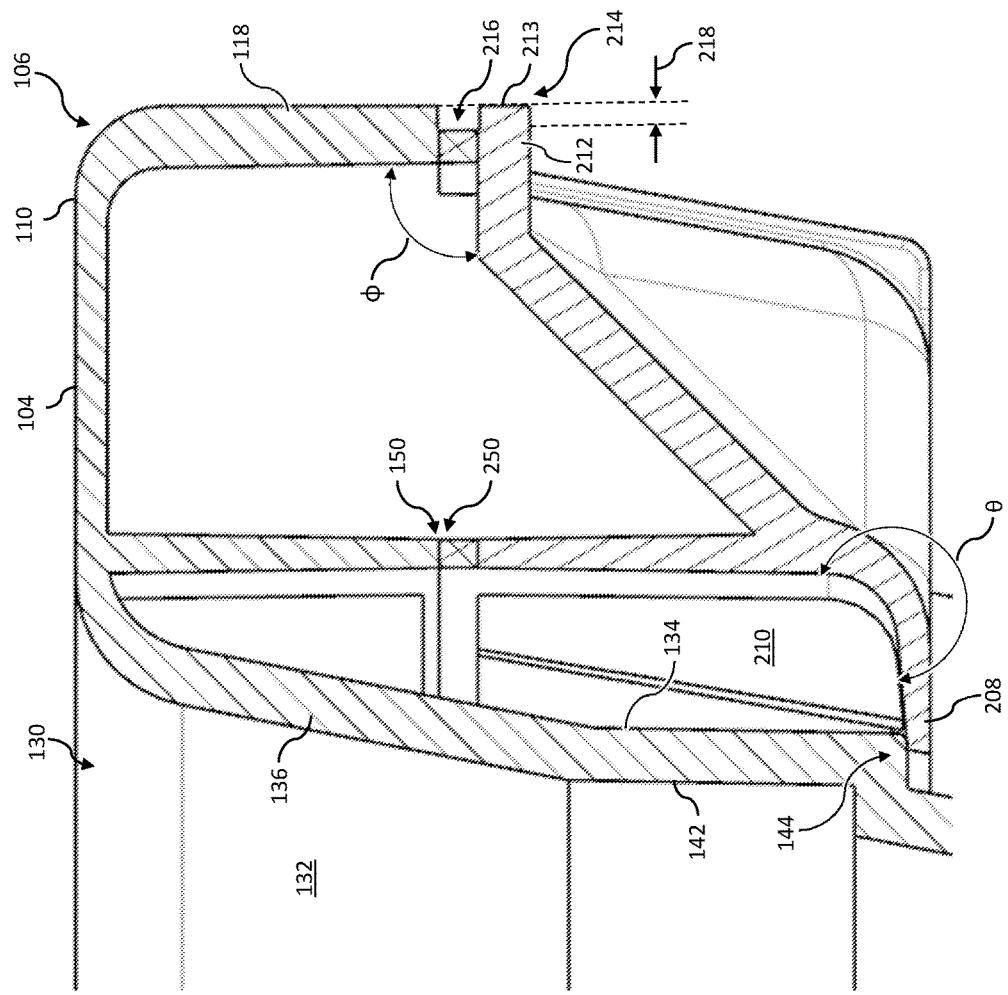
FIG. 9 schematically depicts enlarged view 9 of the nestable pallet of FIG. 4 according to one or more embodiments shown and described herein.

Referring collectively to FIGS. 4, 6 and 9, the lower deck 200 can comprise a joining platform 212 configured to join the lower deck 200 with the outer rim 118 of the upper deck 102. The joining platform 212 can have an outer edge 213 that forms a perimeter 214 of the lower deck 200. Accordingly, the joining platform 212 can extend along the lower deck 200 and towards the perimeter of the lower deck 200. The joining platform 212 can be aligned with the outer rim 118 of the upper deck 102 at a joining angle φ. In some embodiments, the joining angle φ can be substantially acute such as, for example, less than about 150° in one embodiment, between about 75° and about 115° in another embodiment, or about 90° in a further embodiment.

According to the embodiments described herein, the joining platform 212 and the outer rim 118 can cooperate to define a joining feature 216 that facilitates joining of the upper deck 102 and the lower deck 200. For example, the joining feature 216 can be configured to facilitate plastic welding of the outer rim 118 of the upper deck 102 to the joining platform 212. Accordingly, the upper deck 102 and the lower deck 200 can be joined with a plastic weld applied to the joining feature 216. In some embodiments, the joining feature 216 can define a recessed region with respect to the outer rim 118, the perimeter 214 of the lower deck 200, or both. For example, the joining feature 216 can be recessed by an offset distance 218 from an outer face of the outer rim 118. Alternatively or additionally, the joining feature 216 can be recessed by the offset distance 218 from the perimeter 214 of the lower deck 200. In some embodiments, the joining platform 212 can comprise a collar 220 that is configured to form at least a portion of the joining feature 216. The collar 220 can project upwards from the joining platform 212 and towards the upper deck 102. The collar 220 of the joining platform 212 can be recessed by the offset distance 218 from the perimeter 214 of the lower deck 200. Alternatively or additionally, the outer rim 118 of the upper deck 102 can comprise a collar 148 that is configured to form at least a portion of the joining feature 216. The collar 148 can project downwards from the outer rim 118 and towards the lower deck 200. The collar 148 of the outer rim 118 can be recessed by an offset distance 218 from the outer face of the outer rim 118.

Referring collectively to FIGS. 3, 8, 10, and 11, the nestable pallet 100 can comprise an internal structure configured to strengthen the nestable pallet 100. In some embodiments, the upper deck 102 can comprise a plurality of upper structural members 160 that extend away from the support deck 104 of the nestable pallet 100. The lower deck 200 can comprise a plurality of lower structural members 260 that extend away from the bottom 224 of the lower deck 200. Each of the upper structural members 160 and lower structural members 260 can be formed as a substantially sheet-like body. In some embodiments, the upper structural members 160 and the lower structural members 260 can be configured to contact one another such that the lower deck 200 provides support to the support surface 104. Accordingly, the upper structural members 160 can extend to an interface portion 150 of the upper deck 102 and the lower structural members 260 can extend to an interface portion 250 of the lower deck 200. Furthermore, the upper structural members 160 can be correspondingly shaped to the lower structural members 260.

In some embodiments, the lower structural member 260 of the lower deck 200 can span between multiple foot strengthening orifices 202. For example, the perimeter 214 can comprise a plurality of substantially linear edges. Specifically, the perimeter 214 can comprise a first edge 230, a second edge 232, a third edge 234, and a fourth edge 236. In some embodiments, the first edge 230 can be substantially parallel to the third edge 234. Likewise, the second edge 232 can be substantially parallel to the fourth edge 236. Each of the first edge 230, the second edge 232, the third edge 234, and the fourth edge 236 can intersect with another edge to form an intersection region 238.

Figure 10:
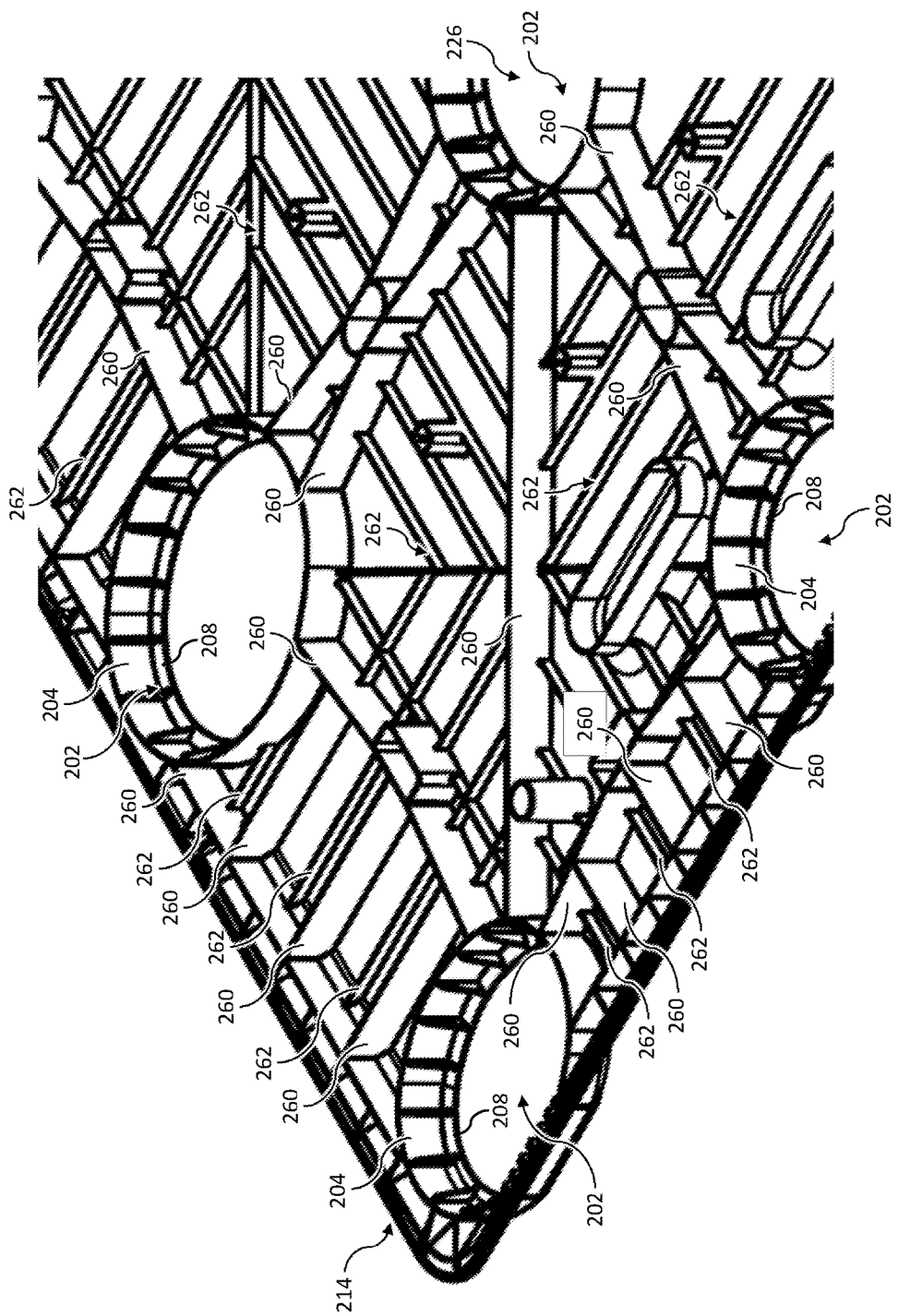
FIG. 10 schematically depicts enlarged view 10 of the lower deck of FIG. 8 according to one or more embodiments shown and described herein.
Figure 11:
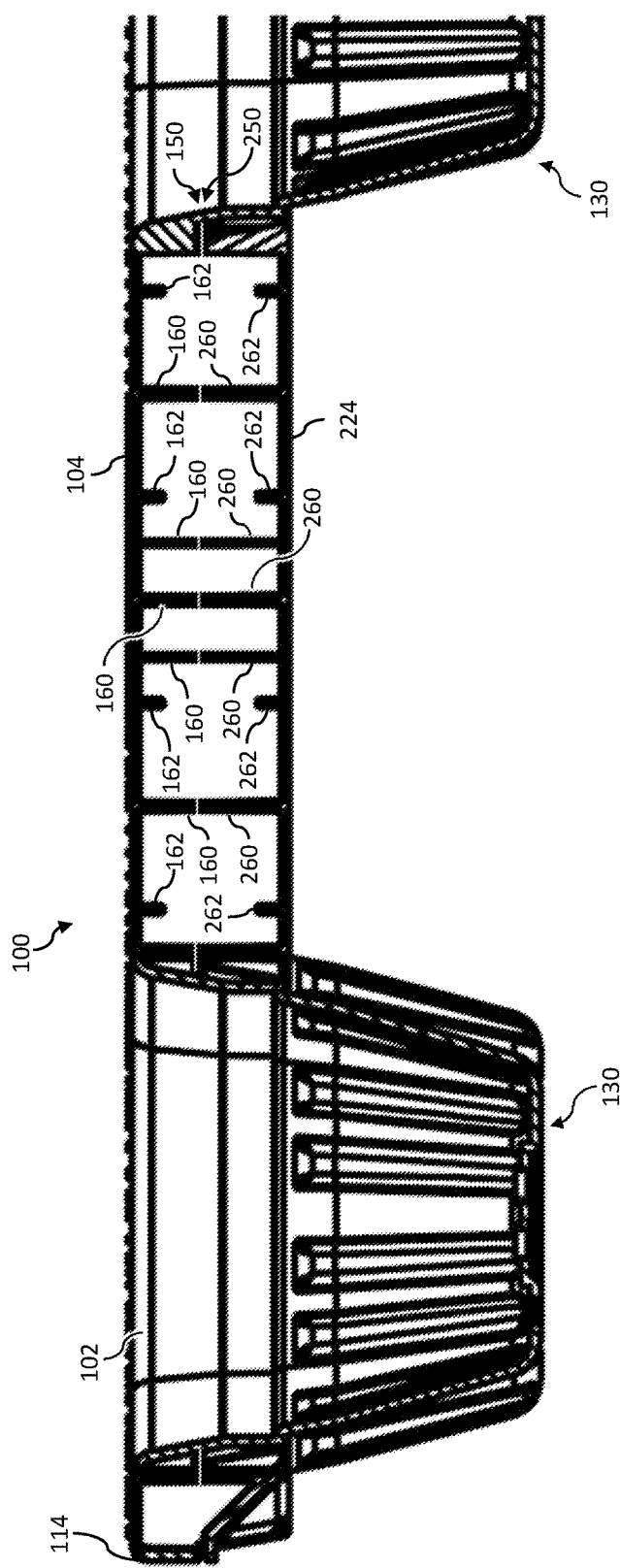
FIG. 11 schematically depicts a cross-sectional view taken along line 11-11 of the nestable pallet of FIG. 2 according to one or more embodiments shown and described herein.

Referring now to FIG. 10, the lower deck 200 can comprise a plurality of foot strengthening orifices 202 adjacent to the perimeter 214 of the lower deck 200. One or more lower structural members 260 can extend along a path between neighboring foot strengthening orifices 202 that are adjacent to the perimeter 214. Optionally, the lower structural members 260 can be substantially arcuate, i.e., the path formed by the lower structural member 260 be curved into a body that is longer than the distance between neighboring foot strengthening orifices 202.

In further embodiments, the lower deck 200 can comprise a foot strengthening orifice 202 positioned substantially at the center 226 of the lower deck 200 and a foot strengthening orifice 202 positioned adjacent to an intersection region 238 of the lower deck 200. One or more of the lower structural members 260 can span from the foot strengthening orifice 202 positioned substantially at the center 226 to the foot strengthening orifice 202 positioned adjacent to the intersection region 238. In some embodiments, the lower structural members 260 can extend along a diagonal path between the foot strengthening orifice 202 positioned substantially at the center 226 and the foot strengthening orifice 202 positioned adjacent to the intersection region 238. In some embodiments, the diagonal path can substantially bisect the intersecting edges, i.e., the first edge 230 and the fourth edge 236.

Referring collectively to FIGS. 3, 8, 10, and 11, the upper deck 102 can comprise a plurality of upper stub members 162 configured to strengthen the upper deck 102. Each of the upper stub members 162 can extend away from the support deck 104 of the nestable pallet 100 along a distance that is shorter than the upper structural members 160. The lower deck 200 can comprise a plurality of lower stub members 262 configured to strengthen the lower structural members 260. Each of the lower stub members 262 can extend away from the bottom 224 of the lower deck 200 along a distance that is shorter than the lower structural members 260. Each of the upper stub members 162 and lower stub members 262 can be formed as a substantially sheet-like body. In some embodiments, the lower stub members 262 can span adjacent lower structural members 260 such that the lower structural members 260 are strengthened to resist twisting or bending. It is noted that the upper deck 102 can comprise an internal structure that is substantially similar to the lower deck 200. Accordingly, in some embodiments, the upper deck 102 can be provided with upper structural members 160 and upper stub members 162 that mirror the lower structural members 260 and lower stub members 262 of the lower deck 200.

Referring collectively to FIGS. 1, 3, 4, 6 and 7, embodiments the nestable pallet 100 can be formed according to the methods provided herein. In some methods, the upper deck 102 can be formed into a structure, as described above. Alternatively or additionally, the lower deck 200 can be formed into a structure, as provided herein. Accordingly, each of the upper deck 102 and the lower deck 200 can be formed as separate components that can be joined together to form the nestable pallet 100. As is noted above, the upper deck 102 and the lower deck 200 can be joined utilizing heat. For example, the upper deck 102 can comprise an interface portion 150 and the lower deck 200 can comprise an interface portion 250. The interface portion 150 and the interface portion 250 can contact one another when the upper deck 102 and the lower deck 200 are combined (FIGS. 4 and 6). In some embodiments, each of the interface portion 150 and interface portion 250 can be heated to a joining temperature. The joining temperature can correspond to a temperature of the thermoplastic material that softens the material such as, but not limited to, the melting point. Accordingly, the upper deck 102 and the lower deck 200 can be heated to a joining temperature corresponding to the desired heat joining process.

Figure 7:
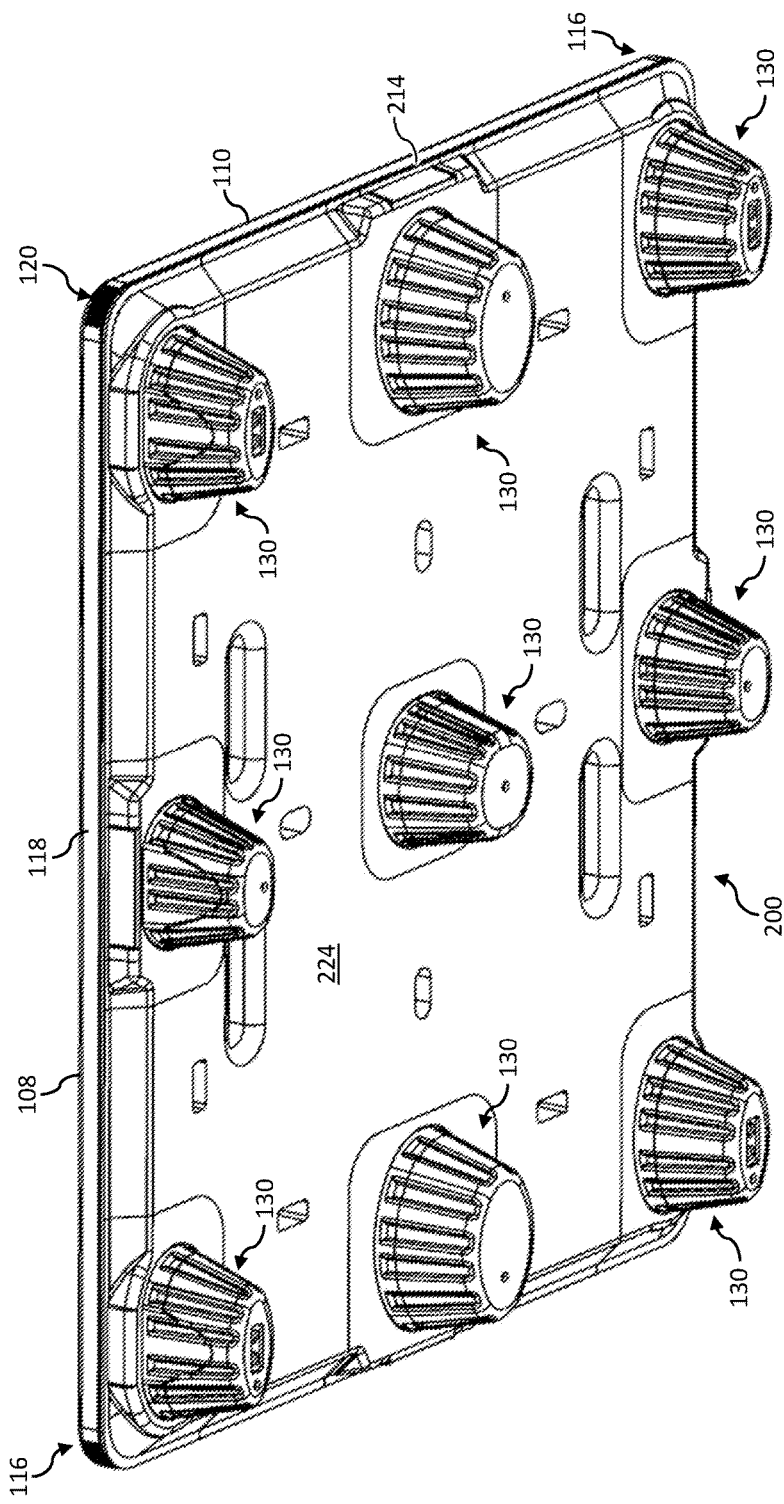
FIG. 7 schematically depicts a bottom perspective view of the nestable pallet of FIG. 1 according to one or more embodiments shown and described herein.

Referring collectively to FIGS. 3, 6, and 7, the upper deck 102 and the lower deck 200 can be combined together. Specifically, upper deck 102 and the lower deck 200 can be aligned with one another according to the desired structure for the nestable pallet 100. In some embodiments, the foot members 130 of the upper deck 102 can be inserted into the foot strengthening orifices 202 of the lower deck 200. For example, the foot members 130 of the upper deck 102 can be aligned with the foot strengthening orifices 202 of the lower deck 200. Once aligned, relative motion with respect to the upper deck 102 and the lower deck 200 can be provided along the insertion direction 222 to urge the upper deck 102 and the lower deck 200 together. In some embodiments, the foot strengthening orifices 202 can be largest at the top edge 206 of the lower deck 200. Specifically, the perimeter of the inner surface 204 at the top edge 206 can be larger than the perimeter of the support rim 208. Accordingly, the foot strengthening orifices 202 can be configured to aid in alignment. Moreover, the width of the stiffening members 210 can be shaped, as described above, to further assist in alignment. That is, the width of the stiffening members 210 can improve the alignment between the upper deck 102 and the lower deck 200, as the upper deck 102 and the lower deck 200 are urged together along the insertion direction 222.

In some embodiments, the upper deck 102 and the lower deck 200 can be heated to the joining temperature prior to being placed into contact. Alternatively or additionally, the upper deck 102 and the lower deck 200 can be heated to the joining temperature while in contact. For example, the upper deck 102 and the lower deck 200 can be heated to the joining temperature by applying a bead of heated weld material to the joining feature 216.

Referring collectively to FIGS. 4 and 6, once the foot members 130 are fully inserted in the foot strengthening orifices (FIG. 4), the foot members 130 can be constrained by the foot strengthening orifices 202, as described above. Accordingly, the interface portions 150 of the upper deck 102 and the lower deck 200 can be placed into contact with one another. While in contact with one another, the upper deck 102 and the lower deck 200 can be cooled from the joining temperature to form the nestable pallet 100. In some embodiments, pressure can be applied to the upper deck 102 and the lower deck 200 to urge the upper deck 102 and the lower deck 200 together, while being cooled.

It should now be understood that the nestable pallets described herein can be formed from an upper deck having a plurality of foot members and a lower deck configured to add structural support to the foot members. Specifically, the lower deck can comprise foot strengthening orifices that concentrically surround the foot members to mitigate plastic creep and bending moments. Moreover, the plastic pallets described herein can be provided with stiffening members, a joining feature, or both, which aid in the construction of the nestable pallet.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Accordingly, a quantitative representation preceded by the term "about" should be understood to include the exact quantity in addition to a functionally equivalent range surrounding the exact quantity. Moreover, every explicitly described quantitative range described hereinabove should be understood to include every narrower quantitative range that is bounded by the explicitly described quantitative range, as if each narrower quantitative range was expressly described. For example, an explicitly described range of "between about 75° and about 115°" should be considered to include narrower range between (and inclusive of) the minimum value of 75° and the maximum value of 115°; i.e., all ranges beginning with a minimum value of 75° or more and ending with a maximum value of 115°; or less, e.g., between about 80° and about 110°, between about 90° and about 100°, etc.

Furthermore, it is noted that directional references such as, for example, upwards, downwards, or the like have been provided for clarity and without limitation. Specifically, it is noted such directional references are made with respect to the normal operation of the pallets described herein. Thus, the directions may be reversed or otherwise oriented in any direction by making corresponding changes to the provided directional references with respect to the structure to extend the examples described herein While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A nestable pallet comprising:
an upper deck that forms a product support region, wherein the upper deck comprises a plurality of foot members each formed as a cavity within the product support region of the upper deck, and wherein each of the foot members comprises a base portion offset downward from the product support region of the upper deck; and
a lower deck joined to the upper deck and disposed downwards from the upper deck, wherein the lower deck comprises a plurality of foot strengthening orifices, wherein each of the plurality of foot strengthening orifices comprises an inner surface that extends from a top edge of the lower deck to a support rim, and wherein the foot members of the upper deck are received by the foot strengthening orifices and constrained by the support rim.

2. The nestable pallet of claim 1, wherein each of the foot members comprises a mounting feature formed at a shank portion that is disposed between the product support region of the upper deck and the base portion, and wherein the mounting feature of the foot members contacts the support rim of the foot strengthening orifices.

3. The nestable pallet of claim 2, wherein the foot members are constrained concentrically by the foot strengthening orifices.

4. The nestable pallet of claim 2, wherein the foot members are fluted and comprise strengthening furrows.

5. The nestable pallet of claim 4, wherein the strengthening furrows extend along the foot members between the shank portion and the base portion.

6. The nestable pallet of claim 1, wherein the support rim is aligned with the inner surface at a support angle $\theta$ that is obtuse.

7. The nestable pallet of claim 6, wherein each of the foot strengthening orifices comprises stiffening members coupled to the inner surface and the support rim.

8. The nestable pallet of claim 7, wherein a width of each of the stiffening members proximate to the top edge of the lower deck is relatively small compared to the width proximate to the support rim.

9. The nestable pallet of claim 1, wherein each of the foot members comprises a flared mouth that forms a radius that smoothly transitions from the product support region of the upper deck.

10. The nestable pallet of claim 1, wherein the upper deck and the lower deck are formed from a thermoplastic material.

11. A nestable pallet comprising:
an upper deck that forms a product support region that is demarcated by a first perimeter, wherein the upper deck comprises an outer rim that extends away from the first perimeter of the upper deck; and
a lower deck disposed downwards from the upper deck, wherein the lower deck comprises a joining platform that forms a second perimeter and further comprises a plurality of food strengthening orifices that each comprise a support rim, and wherein the joining platform is aligned with the outer rim of the upper deck at a joining angle $\varphi$ that is acute, wherein each of the plurality of foot strengthening orifices comprises an inner surface that extends from a top edge of the lower deck to the support rim;
wherein the joining platform and the outer rim cooperate to define a joining feature, wherein the joining feature is configured to facilitate joining of the upper deck and the lower deck; and wherein the joining platform comprises a collar that projects upwards from the joining platform towards the upper deck and forms at least a portion of the joining feature.

12. The nestable pallet of claim 11, wherein the collar is recessed by an offset distance from the second perimeter.

13. The nestable pallet of claim 11, wherein the joining feature is recessed with respect to the outer rim, the second perimeter, or both.

14. The nestable pallet of claim 13, wherein the upper deck and the lower deck are joined with a plastic weld applied to the joining feature.

15. The nestable pallet of claim 11, wherein the outer rim is aligned with the product support region at a downward angle $\beta$ that is obtuse.

16. The nestable pallet of claim 11, wherein the first perimeter comprises edges that intersect to form an intersection region, and wherein the outer rim forms a radius as the outer rim travels along the first perimeter at the intersection region.

17. The nestable pallet of claim 16, wherein the outer rim comprises, at the intersection region, a friction member that forms a region of relatively high friction compared to the outer rim.

18. The nestable pallet of claim 11, wherein the upper deck comprises a plurality of foot members each formed as a cavity within the product support region of the upper deck.

19. The nestable pallet of claim 18, wherein the plurality of foot members are fluted and comprise strengthening furrows.

\* \* \* \* \*